Jan. 20, 1959     M. C. LEVERETT ET AL     2,870,075

NUCLEAR REACTOR UNLOADING APPARATUS

Filed March 3, 1945     3 Sheets-Sheet 1

Inventors:
Miles C. Leverett
John P. Howe

Jan. 20, 1959    M. C. LEVERETT ET AL    2,870,075
NUCLEAR REACTOR UNLOADING APPARATUS
Filed March 3, 1945    3 Sheets-Sheet 2

Witnesses:
Herbert E. Metcalf
Paul J. Glaister

Inventors:
Miles C. Leverett
John P. Howe
By Robert A. ~~~~~~
    Attorney:

United States Patent Office 2,870,075
Patented Jan. 20, 1959

2,870,075

NUCLEAR REACTOR UNLOADING APPARATUS

Miles C. Leverett, Oak Ridge, Tenn., and John P. Howe, Richland, Wash., assignors to the United States of America as represented by the United States Atomic Energy Commission Application March 3, 1945, Serial No. 580,783

2 Claims. (Cl. 204—193.2)

The present invention relates to slow neutron chain reacting systems, commonly referred to as neutronic reactors, and it has particular relation to apparatus of this character utilizing bodies of fissionable material arranged geometrically in lattice structures within a suitable moderator such as carbon, heavy water ($D_2O$), or beryllium.

In certain existing designs of apparatus of this type, uranium metal or other composition containing a known percentage of a fissionable material, such as, $U^{235}$, $U^{233}$ or $94^{239}$ is utilized as the reactive material, the uranium or other metal containing the fissionable material being formed into cylindrical slugs or rods which preferably include a protective jacket or coating of aluminum, or other suitable material having low neutron absorption characteristics. The coated or jacketed slugs are contained within thin walled aluminum tubes having a somewhat greater cross sectional area than the slug bodies so as to provide an annular passageway through which a cooling medium, as, for example, water can be circulated to remove the reaction produced heat. Suitable means are provided in order to obtain uniform spacing of the slugs with respect to the walls of the tubes within which the slugs are contained. Usually the inner walls of the tubes are provided with longitudinally extending, spaced ribs or tracks which support the slugs concentrically within the tubes.

After the neutronic reaction has proceeded for a substantial period of time it frequently is found desirable to remove the fissionable bodies in order to remove fission products or other products or for other purposes as described in copending application of Wigner, Ohlinger, Weinberg, and Young Serial No. 568,900, filed December 19, 1944.

Because of the radioactive nature of the end products of the chain reaction, the most practical method of removing the reactive material slugs at the conclusion of any particular reacting period is to push them through the reactor and out of the containing tubes by the use of a suitable pusher or by adding new slugs at the charging end, the new slugs forcing out corresponding numbers of reacted slugs at the discharge end of the reactor. Due to the rather considerable weight of the slugs and because of the fact that the contacting surfaces of both the slugs and the tubes are of aluminum, substantial friction is developed between the slug bodies and the supporting ribs or tracks during the slug removal or introduction operation. This wears and sometimes scores the ribs, often necessitating replacement of the tubes, and in addition it may damage the thin protective jacket of the slug, which is very undesirable. Also, some difficulty has been experienced in getting the slugs in motion since the slugs tend to establish some adherence with the walls of the cooling tubes due to oxide formation, or to other causes. As a result of these difficulties, a need has arisen for some means for minimizing friction and otherwise facilitating the removal of slugs from neutronic reactor structures of the above-described type, and the principal object of our invention is the provision of such means.

As will hereinafter appear, the problem is further complicated because of the fact that a cooling medium must be circulated through the annular space provided between the slugs and the tubes not only during the operation of the reactor but also during the slug removal operation to remove the heat developed by the reaction and by the radio-active decay of the reaction products. A further object of our invention, therefore, is to provide slug removal means in accordance with the above stated principal object which will not interfere with circulation of the cooling medium through the tubes during use.

These and other objects of our invention and the details of one preferred embodiment thereof will be made more apparent by reference to the following description and drawings. In the drawings, Fig. 1 is a diagrammatic view, partially in section, showing certain of the features of a neutronic reactor of the type to which the present invention relates;

Figure 1:
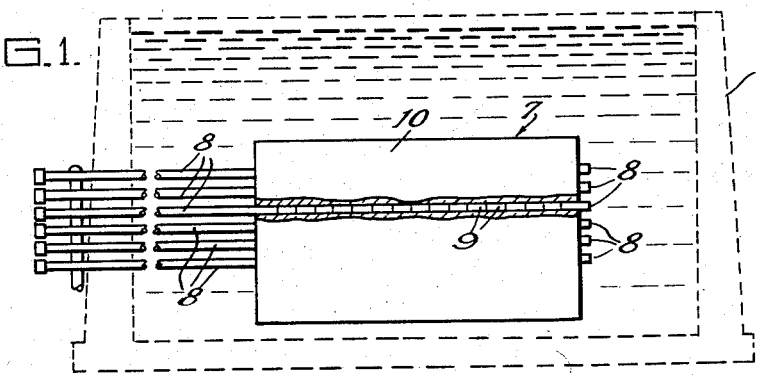

The neutronic reactor illustrated very generally at 7 in Fig. 1 includes a plurality of horizontal tubes 8 for containing slugs 9 of uranium or other reacting material. The tubes 8 are symmetrically disposed in a body 10 usually in a form of sphere, cylinder or parallelepiped such as a cube of suitable neutron moderating material such as graphite, $D_2O$ or beryllium, which serves the purpose of slowing the fast neutrons liberated during fission. The moderating material may conveniently comprise blocks of graphitic carbon, assembled in a cubical structure as illustrated, and the reacting section of the reactor may comprise a generally spherical or cylindrical central portion of the cube. The reactor system includes a neutron reflecting shield (not specifically illustrated) disposed about the reactor 7 and the active portions of the system may conveniently be located within a water filled concrete structure, outlined generally at 6, which acts as a neutron absorbing protective shield.

In Figs. 2 to 5 there is a somewhat more detailed showing of the structure of the individual tubes 8 and of the circulating system which is provided for the water or other cooling medium. The slug containing tubes 8 are arranged in parallel rows, as shown particularly in Figs. 2 and 2A. Each of the individual tubes extends the full length of the reactor 7 and comprises a thin walled, metallic tube, preferably aluminum or other material having low neutron absorbing characteristics, and each tube is provided with two radially positioned ribs 11 (see Fig. 3) arranged to engage the slugs 9 of uranium or other reacting material and to support those slugs concentrically within the tube. In one known reactor the aluminum tubes have an internal diameter of about 1.60 inches, a total length of about 44 feet, and a wall thickness of about 0.130 inch. The ribs 11 are located at the bottom of the tube generally at approximately 90° spacing and have a suitable height, for example .080 inch sufficient to support the slugs above the bottom of the tube. The slugs 9 used in connection with this reactor may be of convenient size. A suitable slug may have an outside diameter of 1.44 inches, a length of 8 inches and contain about 8 pounds of uranium. With these relative dimensions the annular space 13 between the inner wall of the tubes 8 and the slugs 9 will have a uniform thickness of approximately .080 inch. Each of the slugs 9 includes a thin, can-like, outer covering or container 12 of aluminum or other material of low neutron absorption which completely encloses the inner body of uranium metal, thereby protecting the uranium from corrosion and protecting the cooling medium from contamination with radioactive fission products.

Figure 2:
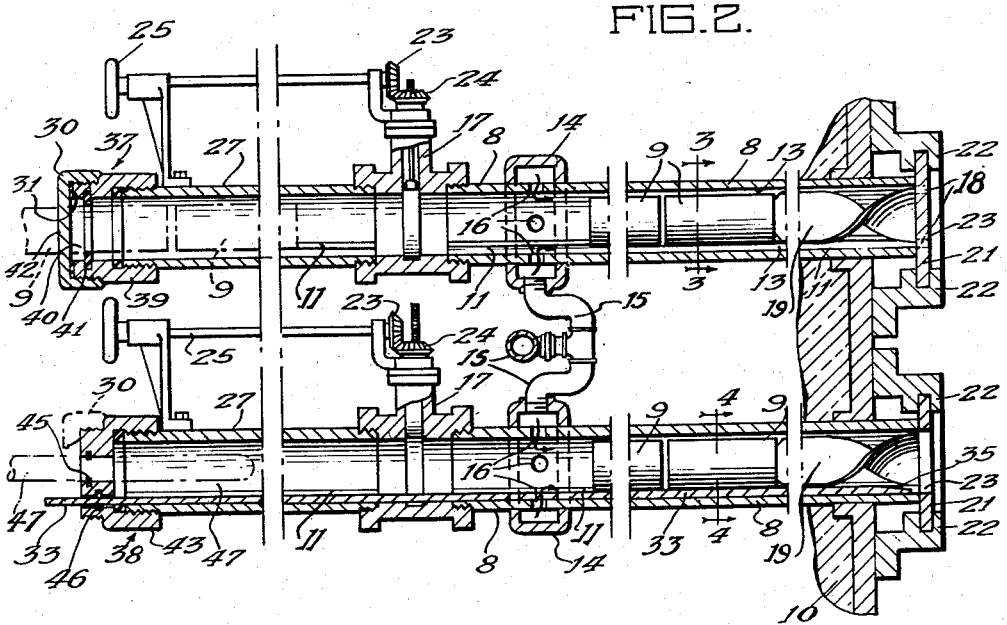
Fig. 2 is a sectional view showing certain of the features of the slug containing tubes of the reactor including an extractor suitable for use in accordance with the invention.
Figure 3:
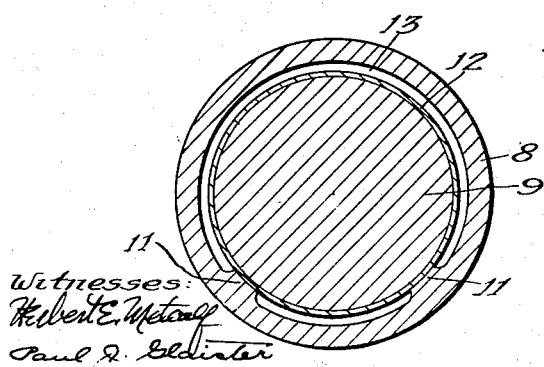
Fig. 3 is a tranvserse, cross-sectional view through one of the slug-containing tubes of Fig. 2 taken along the line 3—3 thereof.
Figure 2A:
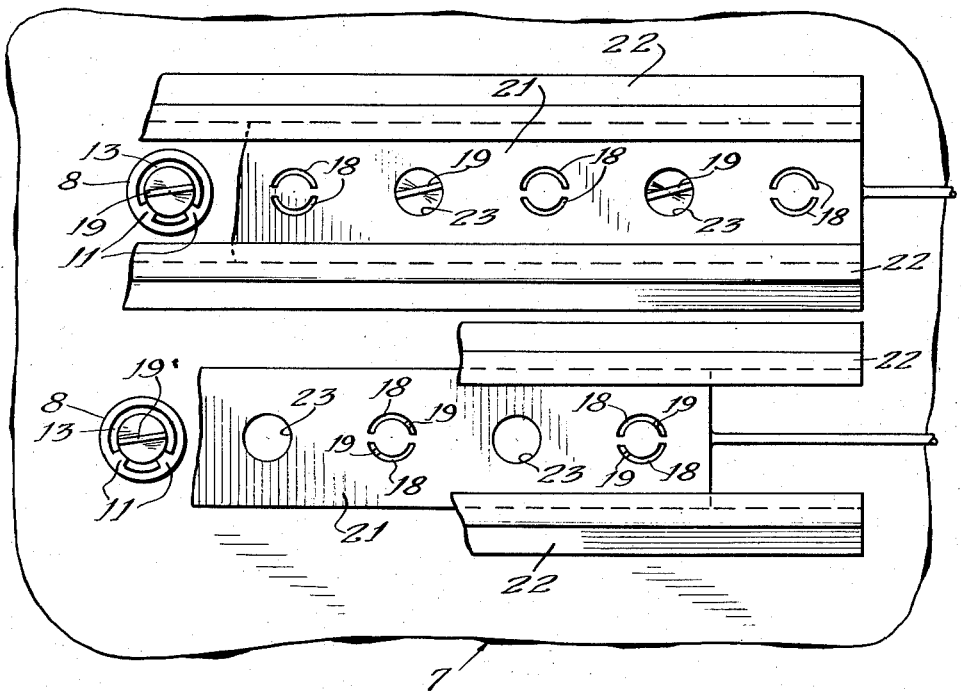
Fig. 2A is a fragmentary and elevation of the slug containing tubes and associated structure shown in section in Fig. 2.
Figure 2B:
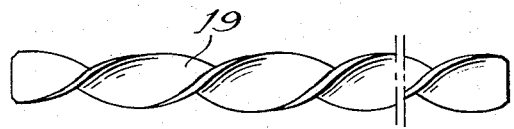
Fig. 2B is an elevational view of one of the dummy slugs contained in the tubes of Fig. 2.

In this structure water is used as a cooling medium, and the water is introduced into each of the tubes 8 by means of a ring header 14 illustrated particularly in Fig. 2. The ring headers 14 are interconnected by suitable manifolds and piping 15 and the cooling water is admitted to the tubes 8 adjacent the charging end thereof through openings 16 in the tube walls.

The charging end of each of the slug containing tubes 8 is normally closed by a valve 17, as illustrated and the discharge ends of the tubes 8 in each of the rows of tubes are adapted to be closed by a slide member 21 having spaced vent openings 18 and slug removal openings 23 provided therein. The vent openings 18 align with the ends of the tubes 8 during normal operation of the reactor and vent the cooling water which is forced through the annular passageways 13 provided between the slugs 9 and the inner walls of the containing tubes 8 to the structure 6. When the reactor is operating at reasonably high capacities there is considerable endwise pressure tending to force the slugs 9 toward the discharge ends of the tubes 8. This pressure might move the end slugs into contact with the vent openings 18, thereby restricting the water flow through the annular passageway 13, which is undesirable, and to obviate this possibility a dummy slug 19 having the form of a twisted ribbon is placed at the discharge end of each tube 8. The dummy slugs 19 are held in place by the slide members 21 and assure free flow of the cooling water through the vent openings 18.

The slide members 21 are supported in suitable guides 22, which are attached to the end of the reactor 7. The slug removal openings 23 are circular in outline and have the same cross-sectional area and spacing as the discharge openings in the tubes 8. During the slug discharge operation the slide members 21 may be operated by suitable apparatus, not shown, to move the slug exit openings 23 therein into coincidence with the discharge ends of the tubes 8, whereby the dummy slugs 19 and the active slugs 9 may be ejected from the tubes 8.

Since, as has been previously stated, the cooling liquid must be continuously circulated during the slug discharge operation, a lock is provided at the inlet or charging end of each of the slug containing tubes 8. This lock includes the valve 17, which may conveniently be operated through a pair of cooperating bevel gears 23 and 24 and an operating handle 25, a section of cylindrical tubing 27 preferably of the same size as the slug containing tubes 8, and gland means, hereinafter described, through which the slugs 9 or a pusher member, not shown, may be introduced into the forward section of the lock without loss of cooling fluid. The tubing 27 has ribs 11 similar to the tubes 8. When the lock is not in use, the inlet end thereof is closed by a cap element 30 and a sealing washer 31, as illustrated in Fig. 2.

Figure 4:
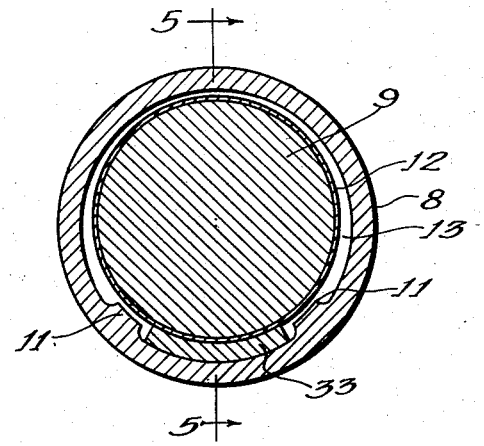
Fig. 4 is a sectional view similar to Fig. 3 taken on the line 4—4 of Fig. 2 illustrating the operation of the slug removal apparatus of our invention.
Figure 5:
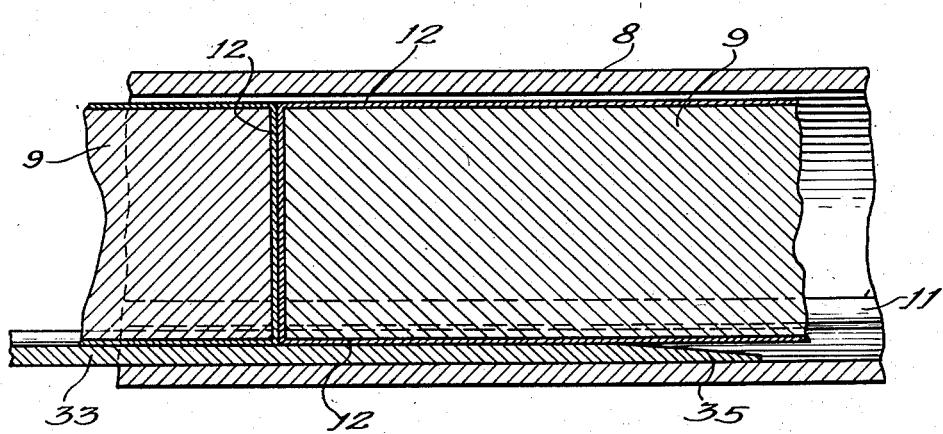
Fig. 5 is a sectional view on the line 5—5 of Fig. 4.

The apparatus used for facilitating the removal of the slug members 9 and for providing a surface on which those members can be moved out of the tubes 8 without wearing or scoring of the surfaces of the slugs or the tubes, comprises an elongated, ribbon-like extractor member 33, which is arcuate in cross-section, as illustrated particularly in Fig. 4, and which is adapted to be introduced into the tubes 8 and 27 between the slug supporting ribs 11. The width of the extractor member 33 is just slightly less than the spacing of the slug supporting ribs 11, and the thickness of the extractor is slightly greater than the effective height of those ribs. The forward end of the extractor is tapered as illustrated at 35; this permits convenient entry of the extractor 33 into the slug containing tubes. Further, since the extractor is held along its sides by the slug supporting ribs 11 and top and bottom by the weight of the slugs pressing it against the tube, it is possible to push the extractor readily into the tubes and to loosen the slugs 9 even at the extreme ends thereof, without buckling of the extractor and without requiring the exertion of unreasonably large force. Tests indicate that a weight of slugs such as is likely to be encountered in apparatus of the type described, that is slug weights of the order of 250 to 350 pounds, can be raised by exerting a longitudinal force along the extractor member of the order of only 50 to 60 pounds. The extractor 33 should be fairly stiff longitudinally, and particularly good results have been obtained with an extractor made of spring metal, for example, stainless steel, stressed into arcuate shape.

Since the curvature of the extractor member 33 substantially conforms to the curvature of the annular passageway 13 provided between the slugs 9 and the walls of the tubes 8, it will be apparent that the slugs 9 will be raised slightly and will rest upon the underlying curved surface of the extractor member 33 when that member has been inserted into the tubes 8 and pushed into place. The extractor member 33 thus provides a slideway on which the slugs 9 amy be moved through and out of the slug containing tubes 8 without contacting the supporting ribs 11. Wearing of the slug protective jackets 12 and the tubes 8 is minimized, and much more satisfactory operation results.

In order to introduce the extractor member 33 into the slug containing tubes 8 without excessive loss of the cooling material, it is desirable, as previously stated, to employ a gland or other sealing means at the charging end of the reactor. An embodiment incorporating two different sealing means on two respective tubes 8 is illustrated in Fig. 2. The arrangement illustrated at 37 in Fig. 2 includes an annular body 39 which is adapted to be screwed onto the inlet end of the outer tubular section 27 of the lock and which is provided with a centrally positioned opening 40 and a gland 41 for receiving both the ejector member 33 and one of the slugs 9. The opening 40 is normally closed by the cap 30. When it is desired to utilize the ejector member 33 to loosen slugs which have become stuck in one of the tubes 8 or to provide a slideway for facilitating movement of the slugs 9 through and out of the tubes 27 and the tubes 8, the valve 17 will be operated to close the inner end of the lock. It will be noted that this will not interfere with the circulation of the cooling liquid. The cap 30 can then be removed and the ejector member 33 together with one or more slugs 9 introduced into the tubular section 27 of the lock. The gland 41 is so designed that it provides a substantially liquid tight seal when both the ejector 33 and one of the slugs 9 or an equivalent means are positioned in the gland 41.

The valve 17 may then be opened and the ejector 33 may be pushed completely through the tube 8 to the discharge end thereof. This operation loosens any adhering slugs and raises all of the slugs out of contact with the supporting ribs 11 so that they rest on the curved upper surface of the ejector member. The slugs 9 may then be discharged from the tube 8 by simply pushing the requisite number of fresh slugs through the gland 41, the ejector member 33 being left in place. At the conclusion of this charging operation, the ejector member 33 will be withdrawn longitudinally from the inlet end of the tube 8, the valve 17 will be operated to close off the tubular section 27 of the lock, and the slug or equivalent means which has been used for sealing purposes will then be removed from the gland 41, the entire operation being carried out without substantial loss of cooling fluid. The cap 30 will then be replaced whereupon the valve 17 may be opened and normal operation of the reactor resumed.

The arrangement at 38 is essentially similar to the 37 structure except that the annular body element 43 thereof has two openings and two glands 45 and 46 provided therein. The gland 46 is of the correct size and proportions to receive the ejector member 33 and the other gland 45 is adapted to receive a pusher rod as indicated by the dot and dash outline 47. The annular body 43 is adapted to be closed by a cap 30 and sealing gasket 31, not shown, similarly to the 37 structure.

In the operation of this arrangement, the valve 17 is first closed so as to seal off the tubular section 27 of the lock from the circulating cooling system. The end closure cap 30 which normally closes the gland openings 45 and 46 is removed. The pusher rod 47 and the ejector 33 will then be inserted into the gland seals 45 and 46 provided for those members, whereupon the valve 17 may be opened, as shown in the lower part of Fig. 2. The ejector member 33 may now be pushed through the lock and through the connecting tube 8 to the discharge end thereof, thereby loosening any adhering slugs and raising all the slugs so that they rest on the curved upper surface of the ejector member. In this position the slugs may readily be ejected from the tube 8 by operation of the pusher member 47, without wearing or scoring of the tube walls or ribs 11 or the slug jackets 12. Moreover, the slug ejection operation can be effected without interruption or material diminution of the flow of cooling liquid.

The recharging of the tubes 8 with new unreacted slugs 9 will usually be effected when using the arrangement illustrated at 37 by removing the annular cap 30 and pushing new slugs into each tube with the valve 17 open. Circulation of the cooling fluid will no longer be required when the reacted slugs have been ejected from the tube.

As a preliminary to any slug discharge operation, it is, of course, necessary that the slide members 21 be operated to bring the circular openings 23 into alignment with the discharge ends of the tube 8, as previously described.

The structure described utilizes water as the cooling medium. It will be understood that other cooling fluids, either liquid or gaseous, can be used and such other fluids are within the contemplation of the invention.

In the foregoing we have disclosed the features of a relatively simple device which can be used in conjunction with neutronic reactors for facilitating the removal of the slugs of active material contained in such reactor. The apparatus is operable not only to loosen slugs which may have become stuck in the slug containing tubes extending through the reactor, but in addition it provides a surface on which the slugs rest and on which they can be readily moved into or out of the tubes without wearing the slug supporting ribs or the slug jackets. The apparatus is capable of use without substantial interference with the normal flow of cooling material through the reactor and at the same time it is positive and simple to operate. The features of the invention which are believed to be novel are particularly pointed out in the claims.

We claim:

1. A device for radiation treating bodies within a neutronic reactor comprising, in combination, a tube traversing said reactor having at least two ribs on its lower surface for supporting the bodies, means to circulate a fluid coolant through said tube including seals at both ends of the tube, and a ribbon-like extractor member insertable into the tube in the space between the ribs and adapted to slide under the bodies, thereby raising said bodies and forming a slideway for removing them from the reactor.

2. A device for radiation treating bodies within a neutronic reactor comprising the elements of claim 1 wherein the seal at one end of the tube includes a first gland confronting the ribs adapted to receive the extractor member, a second gland in said seal, and a push rod insertable through said second gland for pushing the bodies out of the other end of said tube.

References Cited in the file of this patent

UNITED STATES PATENTS

| | | |
|---|---|---|
| 1,234,257 | Bailey et al. | July 24, 1917 |
| 1,382,838 | Koch | June 28, 1921 |
| 1,403,546 | Corrigan | Jan. 17, 1922 |
| 1,479,809 | Headley et al. | Jan. 8, 1924 |
| 1,697,811 | Dailey | Jan. 1, 1929 |
| 1,932,474 | Penhaligen | Oct. 31, 1933 |
| 1,991,934 | McRay | Feb. 19, 1935 |
| 2,034,238 | Karalis | Mar. 17, 1936 |
| 2,174,334 | Steinfels | Sept. 26, 1939 |

FOREIGN PATENTS

| | | |
|---|---|---|
| 114,150 | Australia | May 2, 1940 |
| 861,390 | France | Feb. 7, 1941 |
| 233,011 | Switzerland | Oct. 4, 1944 |

OTHER REFERENCES

Smyth: "Atomic Energy for Military Purposes," page 103, August 1945. (Copy may be purchased from Supt. of Doc., Washington 25, D. C.)